United States Patent [19]

Masuko

[11] Patent Number: 4,752,954
[45] Date of Patent: Jun. 21, 1988

[54] UPSTREAM SIGNAL CONTROL APPARATUS IN BIDIRECTIONAL CATV SYSTEM

[75] Inventor: Akinori Masuko, Kawasaki, Japan
[73] Assignee: Kabushiki Kaisha Toshiba, Kawasaki, Japan
[21] Appl. No.: 809,179
[22] Filed: Dec. 16, 1985

[30] Foreign Application Priority Data

Dec. 19, 1984 [JP] Japan ................. 59-266359
Dec. 19, 1984 [JP] Japan ................. 59-266362
Dec. 20, 1984 [JP] Japan ................. 59-267358

[51] Int. Cl.⁴ .................... H04N 7/167; H04N 7/100; H04H 1/00
[52] U.S. Cl. ............................ 380/20; 358/84; 358/86; 455/2; 455/5
[58] Field of Search ............ 358/114, 122, 84, 86, 358/349; 455/2, 3, 5, 6; 350/10, 20

[56] References Cited

U.S. PATENT DOCUMENTS

| | | | |
|---|---|---|---|
| 3,733,430 | 5/1973 | Thompson et al. | 358/84 |
| 3,886,454 | 5/1975 | Oakley et al. | 455/5 |
| 4,245,245 | 6/1981 | Matsumoto et al. | 358/122 |
| 4,343,042 | 8/1982 | Schrock | 455/5 |
| 4,533,948 | 8/1985 | McNamara et al. | 358/122 |
| 4,536,791 | 8/1985 | Campbell et al. | 358/114 |

FOREIGN PATENT DOCUMENTS 2164719 7/1972 Fed. Rep. of Germany .
3211086 7/1983 Fed. Rep. of Germany .

Primary Examiner—Stephen C. Buczinski
Assistant Examiner—Linda J. Wallace
Attorney, Agent, or Firm—Cushman, Darby & Cushman

[57] ABSTRACT

A CPU in a subscriber terminal generates upstream data and a transmission request signal as an enable signal for sending the upstream data to a broadcast center. An oscillator generates a carrier wave while the enable signal is being held at a predetermined level. A multiplier multiplies the carrier wave with the upstream data and generates the upstream signal. A transmission level adjusting amplifier amplifies the upstream signal, and the amplified signal is sent onto a cable. A detecting means receives a signal associated with the enable signal and discriminates the presence of the carrier wave. A time constant circuit measures the period of time for which the carrier wave is present in response to output from the detecting means. A switching circuit stops supplying at least the carrier wave of a first frequency onto the cable in response to output from the time constant circuit which indicates that the carrier wave has been exceeded the predetermined period of time.

7 Claims, 9 Drawing Sheets

FIG. 7

| | DA0 | DA1 | DA2 | DA3 | DA4 | DA5 | DA6 | DA7 | /DA0 | /DA1 | /DA2 | /DA3 | /DA4 | /DA5 | /DA6 | /DA7 |
|---|---|---|---|---|---|---|---|---|---|---|---|---|---|---|---|---|
| NUMERIC 0 | O | O | O | O | O | O | O | O | - | - | - | - | - | - | - | - |
| NUMERIC 1 | - | O | O | O | O | O | O | O | O | - | - | - | - | - | - | - |
| NUMERIC 2 | O | - | O | O | O | O | O | O | - | O | - | - | - | - | - | - |
| NUMERIC 3 | - | - | O | O | O | O | O | O | O | O | - | - | - | - | - | - |
| NUMERIC 4 | O | O | - | O | O | O | O | O | - | - | O | - | - | - | - | - |
| NUMERIC 5 | - | O | - | O | O | O | O | O | O | - | O | - | - | - | - | - |
| NUMERIC 6 | O | - | - | O | O | O | O | O | - | O | O | - | - | - | - | - |
| NUMERIC 7 | - | - | - | O | O | O | O | O | O | O | O | - | - | - | - | - |
| NUMERIC 8 | O | O | O | - | O | O | O | O | - | - | - | O | - | - | - | - |
| NUMERIC 9 | - | O | O | - | O | O | O | O | O | - | - | O | - | - | - | - |
| VOLUME UP | O | - | O | - | O | O | O | O | - | O | - | O | - | - | - | - |
| VOLUME DOWN | - | - | O | - | O | O | O | O | O | O | - | O | - | - | - | - |
| CHANNEL UP | O | O | - | - | O | O | O | O | - | - | O | O | - | - | - | - |
| CHANNEL DOWN | - | O | - | - | O | O | O | O | O | - | O | O | - | - | - | - |
| PAY PROGRAM | O | - | - | - | O | O | O | O | - | O | O | O | - | - | - | - |
| TEST SIGNAL | - | - | - | - | O | O | O | O | O | O | O | O | - | - | - | - |

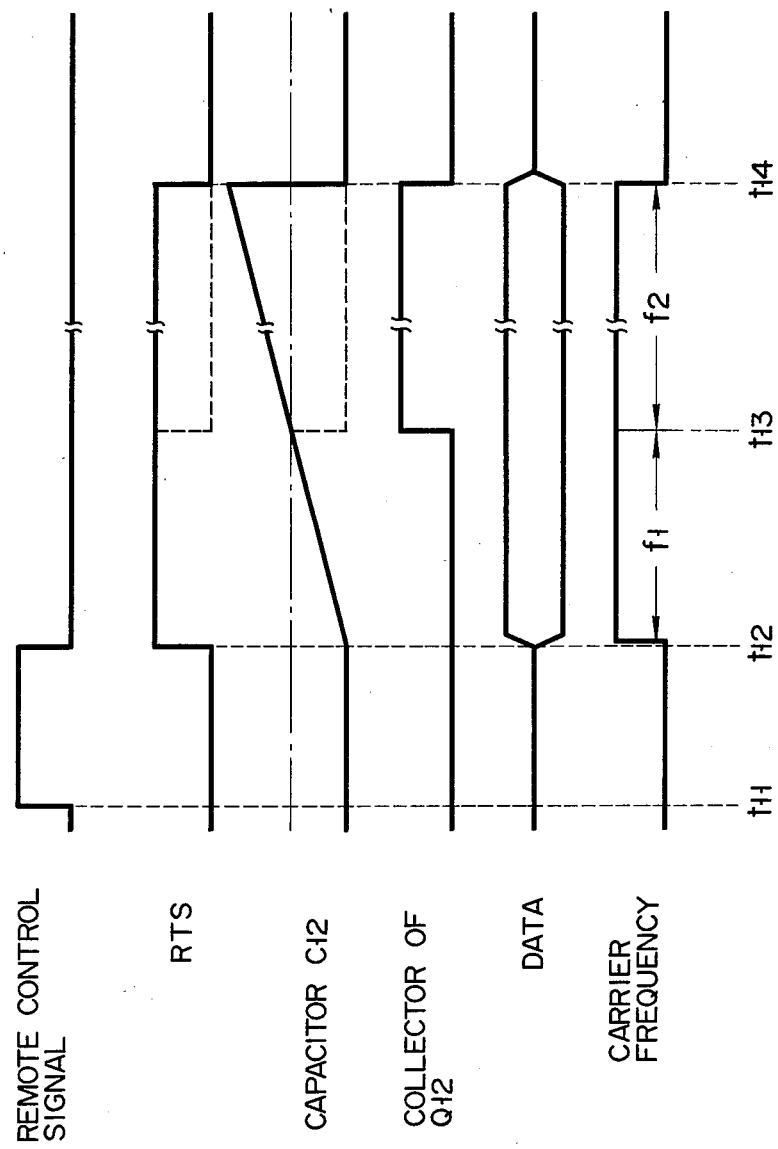

UPSTREAM SIGNAL CONTROL APPARATUS IN BIDIRECTIONAL CATV SYSTEM

BACKGROUND OF THE INVENTION

The present invention relates to an upstream signal control apparatus used in a bidirectional CATV system which allows communication between subscriber terminals and the broadcast center.

A conventional bidirectional CATV system sends television and FM signals (including data service and audio signals) to a large number of subscribers through cables and receives upstream signals from subscriber terminals in a time-division scheme. Each subscriber terminal sends back an upstream signal during a certain period of time (an upstream sending period will be referred to as a polling period hereinafter). The upstream signal includes information for reserving desired pay programs, information representing an answer to a question from the broadcast center, information representing debt incurred by watching pay programs, security information, and the like. The upstream signal is generated by an upstream signal control apparatus in the subscriber terminal. The data transmission time (polling period) of the upstream signal control apparatus is normally set to be very short. This is because the broadcast center must time-divisionally communicate with many subscriber terminals in the CATV system.

A critical problem occurs in a bidirectional CATV system when the upstream signal control apparatus signals out of turn and an upstream signal is sent onto the cable irrespective of a request from the broadcast center. In this case, other subscribers' upstream signals are disturbed, and the broadcast center cannot receive them. For reasons that should be obvious it is necessary to prevent generation of a data carrier in the subscriber's terminal during all but a specifically assigned polling period. To this effect the known modulating schemes are those of FSK, PSK and ASK.

In a conventional CATV system, the level of upstream signals from different subscriber terminals must be uniform at the broadcast center. However, as the physical locations of the subscriber terminals differ, if the transmission gains of the upstream signal control apparatuses are initially set to be identical, the above requirement cannot be satisfied. Therefore, transmission gains of the upstream signal control apparatuses must be adjusted to optimal values in accordance with terminal distance from the broadcast center and trunk amplifiers.

Transmission gain adjustment of an upstream signal control apparatus is performed during the polling period. For this reason, installation personnel must adjust transmission gains while they check transmission level monitoring equipment. Moreover, the transmission gain adjustment period itself is very short as it must be completed within the polling period. When satisfactory adjustment cannot be performed within the first polling period, the transmission gain must be adjusted during the next one or more periods. Therefore, transmission gain adjustment of the upstream signal control apparatuses is time-consuming and inconvenient.

SUMMARY OF THE INVENTION

The present invention has been devised in consideration of the above situation, and it has as its object to provide an upstream signal control apparatus for a bidirectional CATV system, which prevents unnecessary signal transmission onto a trunk.

It is another object of the present invention to provide an upstream signal control apparatus for a bidirectional CATV system, which prevents unnecessary upstream signal transmission onto a trunk by stopping generation of a data carrier signal, even if a failure occurs in an upstream signal output circuit.

It is still another object of the present invention to provide an upstream signal control apparatus for a bidirectional CATV system, whereby a transmission gain adjustment period can be made sufficiently long, irrespective of a polling period, to shorten the total adjustment time.

In order to achieve the above objects of the present invention, there is provided an upstream signal control apparatus in a cable television system having a broadcast center for transmitting a broadcast signal and a downstream signal to a subscriber terminal through a cable and having a subscriber terminal for transmitting upstream data to the broadcast center through the cable, comprising: means for generating an enable signal to transmit the upstream data to the broadcast center in a predetermined period, carrier generating means for generating a carrier wave while the enable signal is generated in the predetermined period, modulating means for modulating the carrier wave by using the upstream data, and carrier transmitting control means for forcedly interrupting the operation of the carrier wave generation means to prevent a carrier transmitting period from exceeding the predetermined period regulated by the enable signal.

BRIEF DESCRIPTION OF THE DRAWINGS

FIG. 7 is a data table showing commands and data of the remote control system of FIG. 6;

FIG. 9 is a timing chart for the remote control mode of the apparatus of FIG. 5.

DETAILED DESCRIPTION OF THE PREFERRED EMBODIMENTS

Figure 1:
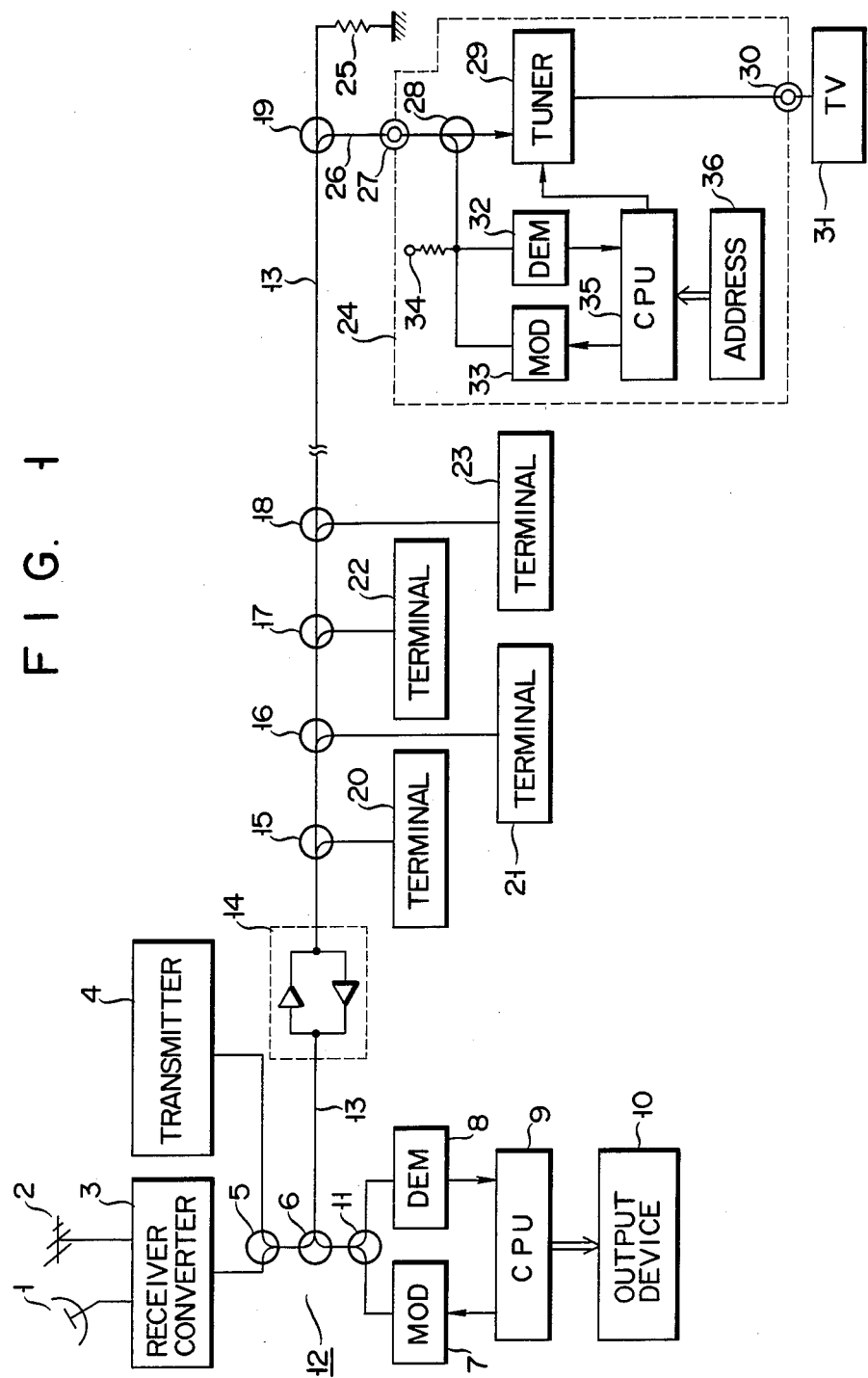
FIG. 1 is a block diagram of a bidirectional CATV system.

FIG. 1 shows a CATV system in which the present invention has been adopted for use. Broadcast center 12 consists in part of receiver converter 3 and transmitter 4. Receiver converter 3 receives a SHF signal from a broadcast satellite with antenna 1 and a VHF or UHF signal with antenna 2. A reception signal is converted to a CATV frequency band signal, and the converted signal is transmitted to subscriber terminals through couplers 5 and 6 and cable 13. Transmitter 4 serves to broadcast pay programs produced by broadcast center 12. Broadcast center 12 further consists of modulator 7, demodulator 8, broadcast center CPU 9 and output device 10 by which to perform communication with subscribers. Output device 10 includes a printer and a CRT display, modulator 7 serves to transmit, as downstream signals, service and polling data to subscribers through couplers 11 and 6 and cable 13. Demodulator 8 serves to demodulate an upstream signal from the subscriber.

Trunk amplifier 14 is arranged midway along cable 13. Subscriber terminals 20, 21, 22, 23, and 24 are connected to cable 13 through respective directional couplers 15, 16, 17, 18, and 19. The end of cable 13 is connected to the same impedance 25 as that of the transmission system.

Of the five subscriber terminals mentioned, only subscriber terminal 24 will be discussed in detail. Terminal 27 of subscriber terminal 24 is coupled to coupler 19 through cable 26. The first terminal of bidirectional coupler 28, inside terminal 24, is connected to terminal 27, and the second terminal is connected to converter tuner 29. Converter tuner 29 converts a received broadcast television signal into a signal of a predetermined channel frequency, and the converted frequency signal is supplied to television receiver 31 through outlet 30.

The third terminal of coupler 28 is connected to demodulator 32 for demodulating a downstream signal and to modulator 33 for sending an upstream signal. Monitor terminal 34 is connected to the output terminal of modulator 33 to monitor the transmission level of the upstream signal.

Demodulator 32 demodulates the downstream signal of a PSK (Phase Shift Keying) scheme, with demodulated data being supplied to CPU 35. A downstream signal of, for example, 70 MHz is sent to the subscriber terminal. Modulator 33 also uses the PSK scheme and modulates the upstream data from CPU 35. The modulated signal is sent back to broadcast center 12 using, for example, a 40-MHz upstream signal.

CPU 35 is also connected to address memory 36. Memory 36 has an address space inherent to terminal 24. This address is used as reference data upon polling from broadcast center 12. When a polling signal address coincides with that in memory 36, terminal 24 starts sending the upstream signal to broadcast center 12.

The arrangement of terminal 24 will be described in detail with reference to FIG. 2. When the polling signal address coincides with the address in memory 36, CPU 35 sets the RTS (request to sent) signal at high level as an enable signal. When a high level RTS signal is supplied to oscillator 41, oscillator 41 generates a carrier wave. The RTS signal is supplied to the base of oscillation transistor Q1 through choke coil L0 and diode D0. Transistor Q1 receives a predetermined base voltage when the RTS signal is set at high level. However, if the RTS is set at low level, the base potential drops, transistor Q1 is turned off and its oscillation is stopped.

Oscillation 41 is constituted of a Colpitts oscillator. The base of transistor Q1 is connected to quartz oscillator X1 through coupling capacitor C0. A series circuit made up of bias resistors R1 and R2 is connected between power source terminal 411 and the ground to apply a base bias voltage to transistor Q1. Capacitor C1, connected between the base and emitter of transistor Q1, serves as a feedback capacitor, and capacitor C2, connected thereto, serves as a by-pass capacitor. A resonator made up of capacitor C3 and coil L1 is connected between the collector of transistor Q1 and terminal 411. The emitter of transistor Q1 is connected to the collector of transistor Q2 through resistor R3. The base of transistor Q2 receives a control pulse from a flip-flop (to be described later). Oscillator 41 is enabled while transistor Q2 is on and disabled when transistor Q2 is turned off.

An oscillation output, i.e., a carrier wave from oscillator 41 is supplied through coupling capacitor CA to multiplier 42. Multiplier 42 receives data from CPU 35 through low-pass filter (LPF) 43 so that the oscillation output is modulated in accordance with the data from CPU 35. The modulated signal serves as an upstream signal which is amplified by amplifier 44, and the amplified signal is sent onto cable 13 through band-pass filter (BPF) 45.

The transmission time (the polling period) of the upstream signal is normally very short, for example, about 1 to 2 seconds for the case where the CATV system involves about 100,000 subscriber terminals, and the transit signals are sent to the broadcast center in 20K bauds. This is because broadcast center 12 of the CATV system must communicate with many subscriber terminals in a time-division manner. However, when an upstream signal or the carrier wave is sent onto cable 13 irrespective of a request from broadcast center 12, communication via other upstream signals is disturbed. Broadcast center 12 cannot receive these disturbed upstream signals. Noise occurs due to the radio interference or unsuitable transmitting level of these signals, thereby damaging the signals on other bandwidths. This signalling out-of-turn state causes, for example, electrostatic failure of CPU 35, disconnection of coil L0 and damage to diode D0.

In order to solve these drawbacks, the transmission time of the upstream signal is limited by carrier transmitting control circuit 46. An output from amplifier 44 is supplied to detecting means 46A in circuit 46. Diode D10, capacitor C10, and resistor R10 constitute a rectifying circuit which rectifies the data carrier signal. A rectified output from the rectifying circuit is supplied to the base of transistor Q11 through inverter 461 and resistor R11. The emitter of transistor Q11 is grounded, and the collector thereof is connected to power source terminal 462 through resistor R12. The collector of transistor Q11 is connected to resistor R13, constituting time constant circuit 46B, and is then grounded through capacitor C11. The emitter of transistor Q11 is connected to the base of transistor Q12 of switching means 46C through Zener diode D11, and resistors R12 and R13 constitute a charge path for capacitor C11. Resistor R13 and transistor Q11 constitute a discharge path for capacitor C11.

The emitter of transistor Q12 is grounded, and its collector is connected to power source terminal 462 through resistor R14 and to the reset terminal of flip-flop 463. The reset terminal of flip-flop 463 is grounded through capacitor C12. Resistor R14 and capacitor C12 constitute an integral circuit for generating a reset pulse to flip-flop 463 when transistor Q12 is turned on.

The set terminal of flip-flop 463 is connected to set pulse $\overline{SET}$ terminal of CPU 35. Set pulse $\overline{SET}$ is generated when CPU 35 determines that the terminal is polled from broadcast center 12. When flip-flop 463 is being set, its output Q is set at high level, and the base potential at transistor Q2 is subsequently and similarly set at high level through resistor R4. Oscillator 41 is thus set in the ready state. The output terminal of flip-flop 463 is connected to initialize terminal $\overline{INIT}$ of CPU 35 through capacitor Ci. Initialize terminal $\overline{INIT}$ is connected to the power source through resistor Ri.

Figure 2:
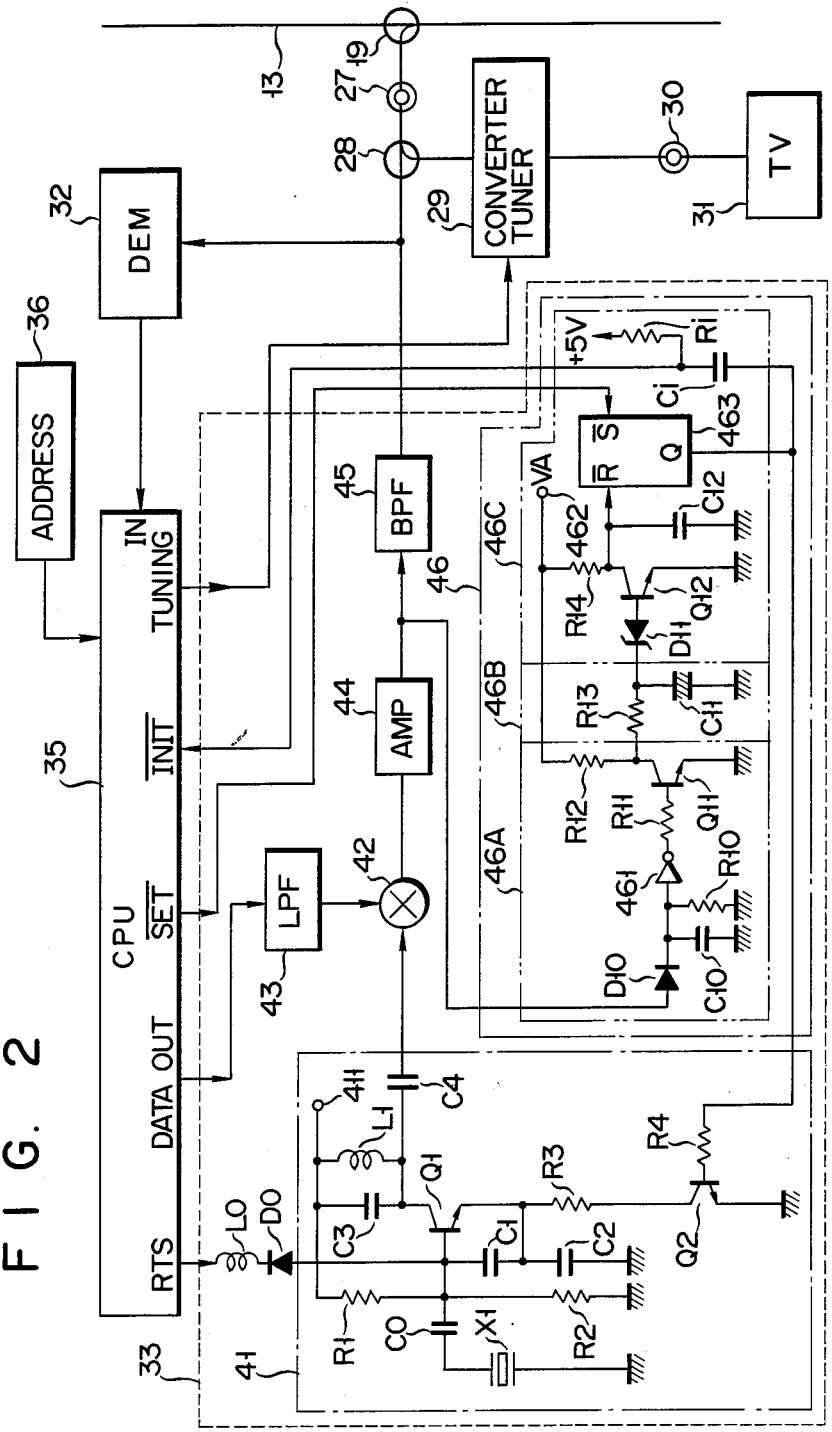
FIG. 2 is a circuit diagram of an upstream signal control apparatus according to an embodiment of the present invention.
Figure 3:
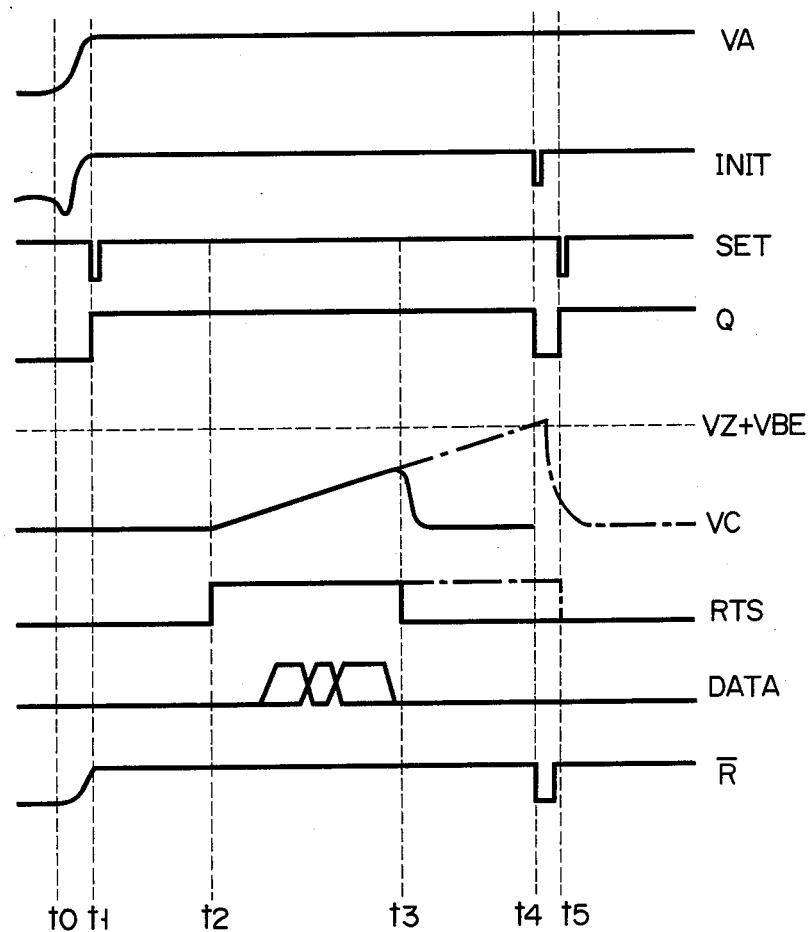
FIG. 3 is a timing chart explaining the operation of the apparatus of FIG. 2.

FIG. 3 is a timing chart of the circuit described above with reference to FIG. 2. Assume that subscriber terminal 24 is turned on at time t0. Power source voltage VA goes to high level VA from zero potential, thereby initializing CPU 35. Low level set pulse SET is generated by CPU 35 at time t1. Output Q from flip-flop 463 goes high and thus transistor Q2 is enabled. When the terminal 24 is turned on, an output signal does not appear from amplifier 44 because a carrier wave is not sent, and the output of inverter 461 is set high. Since transistor Q11 is turned on, capacitor C11 is discharged and transistor Q12 is kept off. Therefore, capacitor C12 is held in the charged state and the reset terminal of flip-flop 463 goes high. When the RTS signal from CPU 35 goes high at time t2 to transmit data, oscillator 41 is started and generates the carrier wave. CPU 35 supplies upstream data to multiplier 42 during the high level period of the RTS signal so that the upstream signal is supplied to broadcast center 12. The high level period t2 to t3 of the RTS signal is determined by CPU 35.

When the RTS signal remains for some reason at a high level, as indicated by the alternate long and short dashed line in FIG. 3, and the carrier wave is continously generated by oscillator 41, data transmitting control circuit 46 performs the following operation. Amplifier 44 continuously generates the carrier wave from time t2 so that the output terminal of inverter 461 is held at low level. Transistor Q11 is turned off, and charging of capacitor C11 started. Terminal voltage VC at capacitor C11 is gradually increased even after time t3, as indicated by the alternate long and short dashed line. When voltage VC exceeds a sum (VZ+VBE) of Zener potential VZ at Zener diode D11 and base-emitter path potential VBE, transistor Q12 is turned on. The reset pulse is thus generated to reset flip-flop 463, and output Q therefrom goes low. In this state, transistor Q2 is turned off and thus oscillator 41 is stopped. Therefore, unnecessary carrier waves will not be sent onto cable 13 after limited time t4.

According to the apparatus of the present invention, when output Q is set at low level, an initialize pulse INIT can be forcedly generated by the differentiator of capacitor Ci and resistor Ri. If CPU 35 is subjected to simple circuit failure and causes the RTS signal to remain at high level, the CPU can be restored, FIG. 3 shows signal waveforms when CPU 35 is restored to its normal operation state. When CPU 35 is normally operated, set pulse SET is generated, and thus the system is restored to its initial state. However, if CPU 35 is not restored by time t5, output Q of flip-flop 463 is held at low level. Therefore, unnecessary carrier wave transmission can be prevented.

Figure 4:
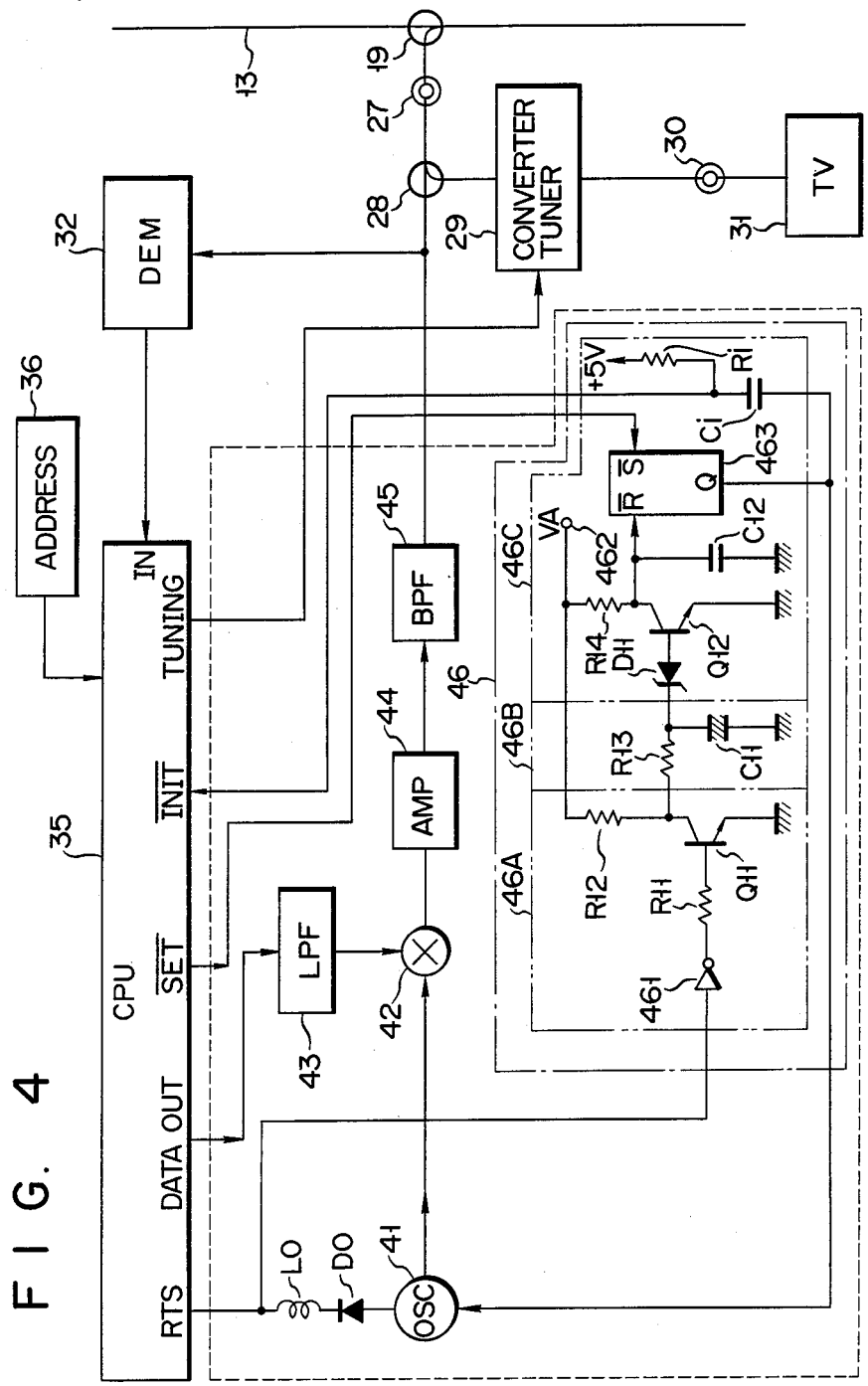
FIG. 4 is a circuit diagram of an upstream signal control apparatus according to another embodiment of the present invention.

In the embodiment of FIG. 2, circuit 46 detects the output of amplifier 44. However, circuit 46 may alternatively monitor the high-level period of the RTS signal as shown in the FIG. 4 circuit diagram of another embodiment of the present invention. In this case, diode D10, capacitor C10, and resistor R10, as shown in FIG. 2, can be omitted from circuit 46, and the RTS signal is directly supplied to inverter 461. Other arrangements are the same as those in the circuit of FIG. 2, and the same operation as therein can be obtained.

In this second embodiment, the operation of oscillator 41 is stopped to prevent an unnecessary carrier wave from being sent out onto the cable. The reason it is prevented from doing so is that the frequency of the carrier wave is the same as that of the upstream signal from other subscriber terminals and interferes therewith.

Figure 5:
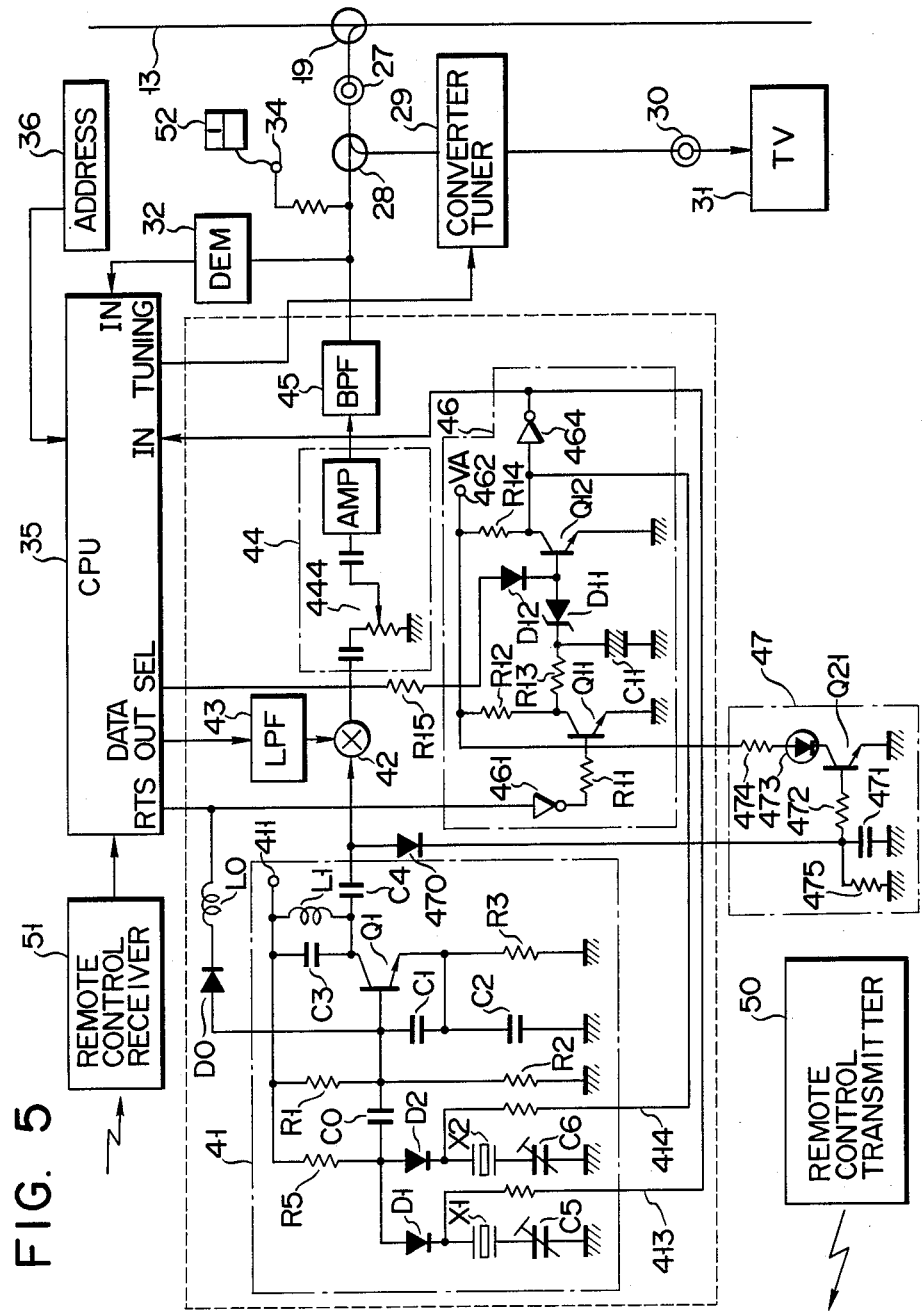
FIG. 5 is a circuit diagram of an upstream signal control apparatus according to still another embodiment of the present invention.

Another embodiment of the present invention, shown in FIG. 5, exemplifies a case wherein a carrier wave of a first frequency is switched to that of a second frequency when a CPU failure occurs while the carrier wave of the first frequency is being transmitted. The same reference numerals in FIG. 5 denote the same parts as in FIG. 2. The apparatus of FIG. 5 will be described hereinafter.

The downstream signal from broadcast center 12 is demodulated by demodulator 32, and the demodulated data is supplied to CPU 35. When the demodulated data represents polling, CPU 35 generates a request to send (RTS) as an enable signal for a predetermined period of time. The RTS signal is supplied to the base of transistor Q1 in oscillator 41 through coil L0 and diode D0. Oscillator 41 turns on and supplies a carrier wave to multiplier 42. Multiplier 42 modulates the carrier wave with the upstream data and generates an upstream signal. The upstream signal is sent onto the cable through amplifier 44 and band-pass filter 45. The transmission time of the upstream signal is limited to within a predetermined period of time by data transmitting control circuit 46, which detects the RTS signal. When the RTS signal is kept high longer than the predetermined period of time due to failure of CPU 35, capacitor C11 is charged at a level high enough to turn on transistor Q12. When signal RTS goes low within the predetermined period of time, capacitor C11 is discharged through transistor Q11, and transistor Q12 is kept off.

In this embodiment, the collector of transistor Q12 is connected to first control terminal 413 of oscillator 41 through inverter 464; and to second control terminal 414 of oscillator 41. Oscillator 41 can selectively generate carrier waves of the first and second frequencies in response to the level of SEL. Oscillator 41 has a series circuit made up of diode D1, quartz oscillator X1, and variable capacitor C5 and a series circuit made up of diode D2, quartz oscillator X2, and variable capacitor C6. Resistor R5 is connected between power source terminal 411 and the anodes of diodes D1 and D2 to supply a bias voltage thereto. If transistor Q12 is kept off, terminal 413 is set at low level and terminal 414 is set at high level. Consequently, diodes D1 and D2 are kept on and off, respectively. Oscillator 41 generates the carrier wave of the first frequency. However, if transistor Q12 is turned on, terminals 413 and 414 are set at low and high levels, respectively, and diodes D1 and D2 are kept off and on, respectively. This being the case, oscillator 41 generates the carrier wave of the second frequency.

Since the oscillation frequencies of oscillator 41 are switched in the circuit of FIG. 5, the circuit can be used in the following manner. During normal operation, an upstream signal has the first frequency. However, when the upstream signal of the first frequency is not stopped for the predetermined period, the oscillation frequency of oscillator 41 is automatically switched to the second frequency. Even if oscillator 41 generates the carrier wave of the second frequency, this wave will not adversely affect an upstream signal of the first frequency.

When the upstream signal of the first frequency is disturbed by an interfering signal, broadcast center 12 sends a frequency selection signal; as the downstream polling signal to the subscriber terminal. When CPU 35 detects the frequency selection signal, it supplies high level selection signal SEL to the base of transistor Q12 through resistor R15 and diode D12. As a result, transistor Q12 is forcibly turned on, and diode D2 is turned on accordingly. The oscillation frequency of oscillator 41 is thus set at the second frequency.

As is apparent from the above description, when the upstream signal of the first frequency cannot be used, the upstream signal of the second frequency can be used so that unimpaired communication between broadcast center 12 and the subscribers can be further guaranteed.

When errors in the circuit of FIG. 5 occur and the high level RTS signal is continued for over the predetermined period, the output from inverter 461 is also set at high level. This state is detected by an error detecting circuit (not shown) constructed by hardware in the CPU 35. When the error is detected, the error detecting circuit supplies the subscriber terminal identification code and accident data as upstream data to multiplier 42 in accordance with the discrimination result. The accident data modulates the carrier wave of the second frequency to the upstream signal which is then transmitted to broadcast center 12. The CPU at broadcast center 12 demodulates the carrier wave of the second frequency. When the breadcast center CPU detects the terminal identification code and accident data, it can determine which subscriber terminal is involved in an accident.

The circuit of FIG. 5 further has remote control receiver 51 for receiving an operation signal from remote control transmitter 50. Reception data from receiver 51 is supplied to CPU 35. The remote control system of this embodiment can cause oscillator 41 to continuously generate the carrier wave which is of the second frequency not normally used, in addition to generation a power on/off operation and a channel selection operation. The upstream signal from filter 45 is independent of polling and is used as a test signal when a pseudo RTS is forcedly continued. The level of the test upstream signal is measured by transmission level monitor 52 connected to terminal 34. The test upstream signal is utilized by installation personnel for adjusting the transmission level. Transmission level adjustment can be performed by adjusting volume control 444 for adjusting the gain of amplifier 44. In this case, the carrier wave from oscillator 41 is supplied through diode 470, to capacitor 471 and resistor 475 of indicator 47. A voltage at capacitor 471 is supplied to the base of transistor Q21 through resistor 472. Transistor Q21 is kept on while oscillator 41 is operated. A current flows through resistor 474, connected to the collector of transistor Q21, and through light-emitting element 473, thereby turning light-emitting element 473 on. Therefore, the user can check, at indicator 47, that oscillator 41 operates continuously.

Figure 6:
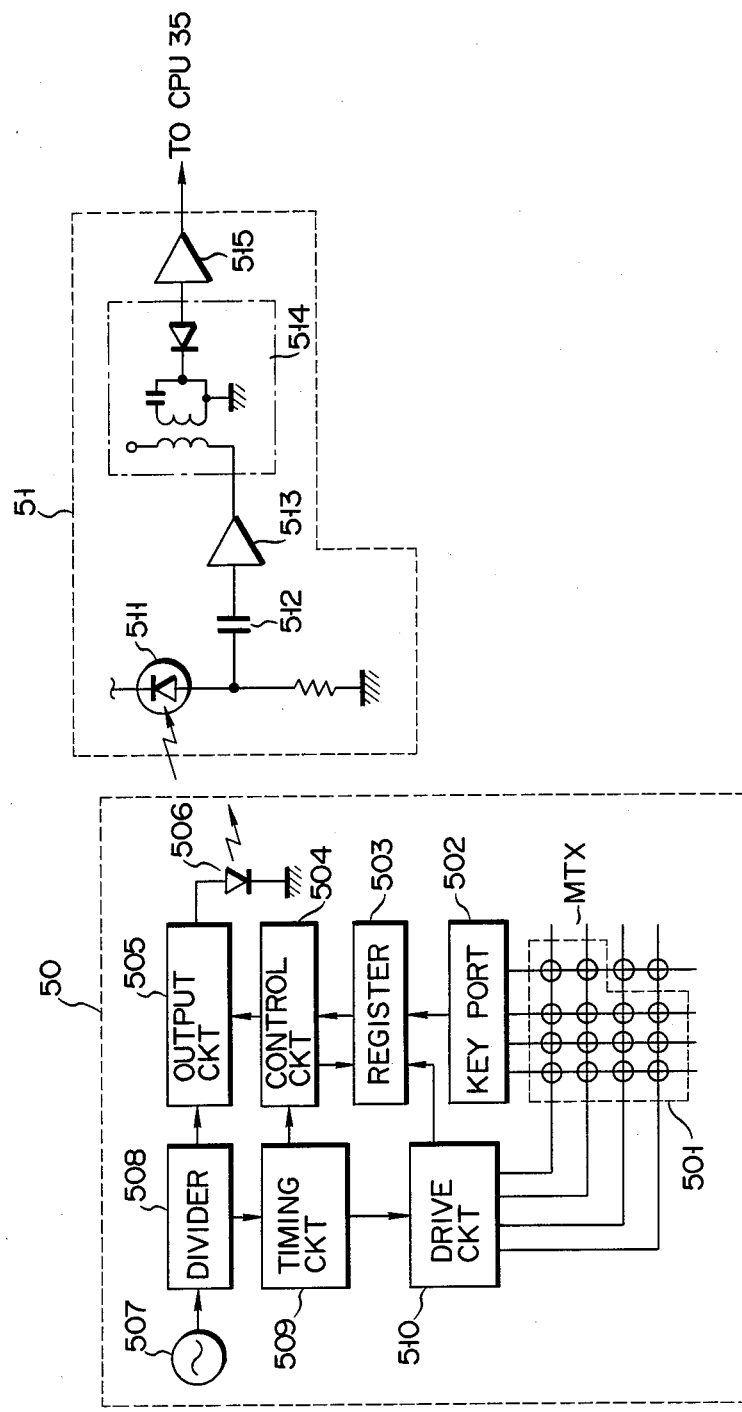
FIG. 6 is a circuit diagram of a remote control system of the apparatus of FIG. 5.

FIG. 6 shows the detailed arrangement of transmitter 50 and receiver 51. Transmitter 50 can transmit a test command. CPU 35 generates the pseudo RTS signal in response to this test command. The test command is generated by key matrix 501 and is stored in register 503 through key port 502. The test command is read out by a control circuit 504 from register 503, and the readout test command is supplied to output circuit 505. Circuit 505 modulates, with the test command, a carrier wave obtained by frequency-dividing the oscillation output from oscillator 507 with frequency divider 508. The modulated output is supplied to infrared ray generator 506. Timing circuit 509 generates various timing signals by using the output from divider 508. Drive circuit 510 drives key matrix 501 and register 503.

An infrared ray signal from transmitter 50 is received by photosensor 511 in receiver 51 and is supplied to amplifier 513 through coupling capacitor 512. An output from amplifier 513 is demodulated by demodulator 514 and is supplied to CPU 35 through amplifier 515.

As is apparent from the above description, the remote control system can generate the test command to allow continuous generation of the carrier wave. FIG. 7 shows types of commands in the remote control system, data DA0 to DA7 and data $\overline{DA0}$ to $\overline{DA7}$. The commands include a numerical input command, a volume level up command, a volume level down command, a channel up command, a channel down command, a pay program reception command, and a test upstream signal generation command.

Figure 8:
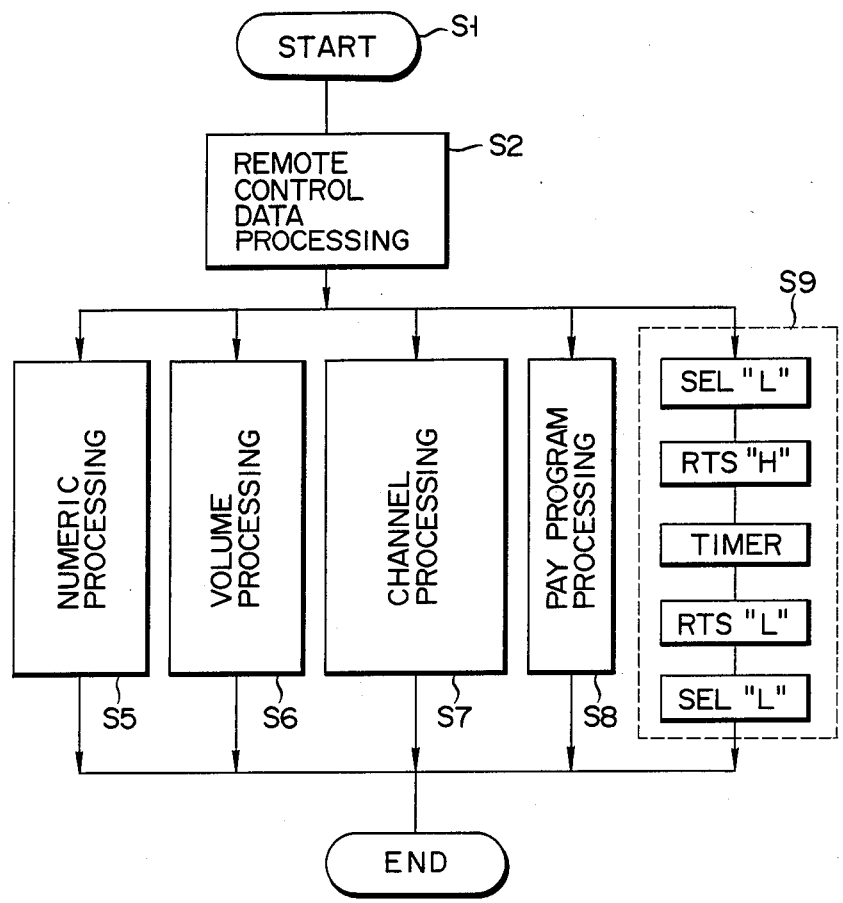
FIG. 8 is a flow chart explaining the operation of the remote control system of FIG. 6.

FIG. 8 is a flow chart explaining the operation when CPU 35 receives remote control data. When remote control data is detected by receiver 51, CPU 35 is started in step S1. CPU 35 discriminates the content of the remote control data in step S2. When CPU 35 determines that the remote control data represents numerical data, the numerical processing routine in step S5 is executed. However, when CPU 35 determines that the remote control data represents volume level control data, the volume level control routine in step S6 is executed. When CPU 35 determines that the remote control data represents channel control data, the channel control routine in step S7 is executed. When CPU 35 determines that the remote control data represents pay program reception data, the pay program reception processing routine in step S8 is executed. In the pay program reception processing routine, a descrambling signal is generated to descramble the scrambled program signal. When CPU 35 determines that the remote control data represents test command data, the transmission processing routine in step S9 is executed. In the transmission processing routine, selection signal SEL from CPU 35 is set at low level, and the RTS signal is set at high level. Thereafter, a timer is started. When a predetermined period of time has elapsed, the timer sets the RTS at low level and signal SEL at low level. The count time period of the timer is sufficiently set to allow for adjustment of the transmission level by utilizing the test upstream signal.

FIG. 9 is a signal timing chart when the remote control system sends the test command. When the remote control signal is transmitted between time t11 and time t12, the RTS from CPU 35 is kept high. Transistor Q11 is turned off and charging of capacitor C12 started. The RTS signal is normally set at low level at time t13, as indicated by the broken line; however, in the remote control test mode, the RTS signal is kept high up to time t14. A charge voltage at capacitor C11 causes transistor Q12 to turn on at time t13, so that first frequency f1 is switched to second frequency f2. The RTS signal is set at low level by the timer in CPU 35 at time t14. The time interval between time t1 and time t14 is sufficient to allow adjustment of the transmission level of the upstream signal at monitor terminal 34. During the interval between time t12 and time t14, test data is sent out from CPU 35. However, data need not be generated since the level of the carrier wave need only be adjusted. The frequency of the test carrier wave is different from the normally used frequency of the carrier wave. However, since frequencies f1 and f2 are close to each other, even if the transmission level of the carrier wave of frequency f2 is adjusted, a similar level can be obtained in the transmission level of the carrier wave of frequency f1.

What is claimed is:

1. An upstream signal control apparatus for a bidirectional cable television system, in which carrier waves unnecessary for transmitting upstream signals are prevented from being transmitted from a subscriber terminal to a broadcast center, said apparatus comprising:

data-processing means for processing downstream signals transmitted from the broadcast center through a cable, for generating a request-to-send signal for a predetermined period of time, and for producing upstream data within said predetermined period of time;

carrier-generating means, driven by the request-to-send signal for said predetermined period of time, for generating carriers which are to be modulated by said upstream data;

modulation means, connected to said data-processing means and said carrier-generating means, for modulating said carriers with said upstream data so as to produce a modulated output;

abnormality-detecting means for monitoring the request-to-send signal output from said data-processing means and defining the period during which the upstream data is transmitted so as to detect whether or not the carriers generated by said carrier-generating means continue to be transmitted to said broadcast center from the subscriber terminal after the expiration of said predetermined period of time; and control means for stopping said carrier-generating means when said abnormality-detecting means detects that the carriers continue to be transmitted after the expiration of said predetermined period of time.

2. An apparatus according to claim 1, wherein said abnormality-detecting means includes:

a time constant circuit having an input terminal for receiving the request-to-send signal from said data-processing means and an output terminal whose potential changes with a predetermined time constant in response to the request-to-send signal;

switching means for comparing the output potential of said time constant circuit with a reference potential and for performing a switching operation in accordance with the results of this comparison; and state-holding means whose output state alters in response to the output of said switching means so as to supply said carrier-generating means with a signal showing that the carriers continue to be transmitted after the expiration of said predetermined period of time.

3. An apparatus according to claim 2, wherein said control means has its state changed when said abnormality-detecting means detects that the carriers continue to be transmitted after the expiration of said predetermined period of time and generates and supplies an output signal representing this change of state to an initializing terminal of said data-processing means through an initialization circuit.

4. An upstream signal control apparatus for a bidirectional cable television system, in which carrier waves unnecessary for transmitting upstream signals are prevented from being transmitted from a subscriber terminal to a broadcast center, said apparatus comprising:

data-processing means for processing downstream signals transmitted from the broadcast center through a cable, for generating a request-to-send signal for a predetermined period of time, and for producing upstream data within said predetermined period of time;

carrier-generating means for generating first carriers for use in a first modulation in response to the request-to-send signal for said predetermined period of time when set in an ordinary operating mode and for generating second carriers for use in a second modulation when set in a special operating mode, said second carriers having a frequency different from that of the first carriers;

modulation means, connected to said data-processing means and said carrier-generating means, for modulating said carriers with said upstream data so as to produce a modulated output;

abnormality-detecting means for detecting whether or not the first carriers generated by said carrier-generating means continue to be transmitted to said broadcast center from the subscriber terminal after the expiration of said predetermined period of time; and control means for causing said carrier-generating means to start generating the second carriers when said abnormality-detecting means detects that the first carriers continue to be transmitted after the expiration of said predetermined period of time.

5. An upstream signal control apparatus for a bidirectional cable television system, in which carrier waves unnecessary for transmitting upstream signals are prevented from being transmitted from a subscriber terminal to a broadcast center, said apparatus comprising:

data-processing means for processing downstream signals transmitted from the broadcast center through a cable, for generating a request-to-send signal for a predetermined period of time, and for producing upstream data within said predetermined period of time;

a carrier-generating means for generating first carriers for use in a first modulation in response to the request-to-send signal for said predetermined period of time when set in an ordinary operating mode and for generating second carriers for use in a second modulation when set in a special operating mode, said second carriers having a frequency different from that of the first carriers;

modulation means, connected to said data-processing means and said carrier-generating means, for modulating said carriers with said upstream data so as to produce a modulated output;

gain control means for controlling the levels of the output signals of said modulation means and for supplying these output signals through said cable;

abnormality-detecting means for detecting whether or not the first carriers generated by said carrier-generating means continue to be transmitted to said broadcast center from the subscriber terminal after the expiration of said predetermined period of time;

control means for causing said carrier-generating means to start generating the second carriers when said abnormality-detecting means detects that the first carriers continue to be transmitted after the expiration of said predetermined period of time;

remote control means for controlling said data-processing means so as to cause said data-processing means to produce the request-to-send signal for a period longer than said predetermined period of time whether or not a request-to-send signal has been generated in response to a request made by the broadcast center; and a monitor terminal connected to a monitor for monitoring the levels of the output signals of said gain control means as long as said carrier-generating means generates the second carriers.

6. An upstream signal control apparatus for a bidirectional cable television system, in which carrier waves unnecessary for transmitting upstream signals are prevented from being transmitted from a subscriber terminal to a broadcast center, said apparatus comprising:

data-processing means for processing downstream signals transmitted from the broadcast center through a cable, for generating a request-to-send signal for a predetermined period of time, and for producing upstream data within said predetermined period of time;

carrier-generating means, driven by the request-to-send signal for said predetermined period of time, for generating carriers which are to be modulated by said upstream data;

modulation means, connected to said data-processing means and said carrier-generating means, for modulating said carriers with said upstream data so as to produce a modulated output;

abnormality-detecting means for monitoring the modulated output of said modulation means so as to detect whether or not the carriers generated by said carrier-generating means continue to be transmitted to said broadcast center from the subscriber terminal after the expiration of said predetermined period of time; and control means for stopping said carrier-generating means when said abnormality-detecting means detects that the carriers continue to be transmitted after the expiration of said predetermined period of time and for supplying an output signal to an initializing terminal of said data-processing means through an initializing circuit.

7. An apparatus according to claim 6, wherein said abnormality-detecting means includes:

detector means for detecting the modulated output of said modulation means;

a time constant circuit having an output terminal coupled to an output terminal of said detector means and having a potential changed with a predetermined time constant in accordance with the output voltage of said detector means;

switching means for comparing the output potential of said time constant circuit with a reference potential and for performing a switching operation in accordance with the results of this comparison; and state-holding means whose output state alters in response to the output of said switching means so as to supply said carrier-generating means with a signal showing that the carriers continue to be transmitted after the expiration of said predetermined period of time.

* * * * *